March 1, 1927.
E. G. THOMAS
TESTING DEVICE
Filed Dec. 17, 1923
1,619,164
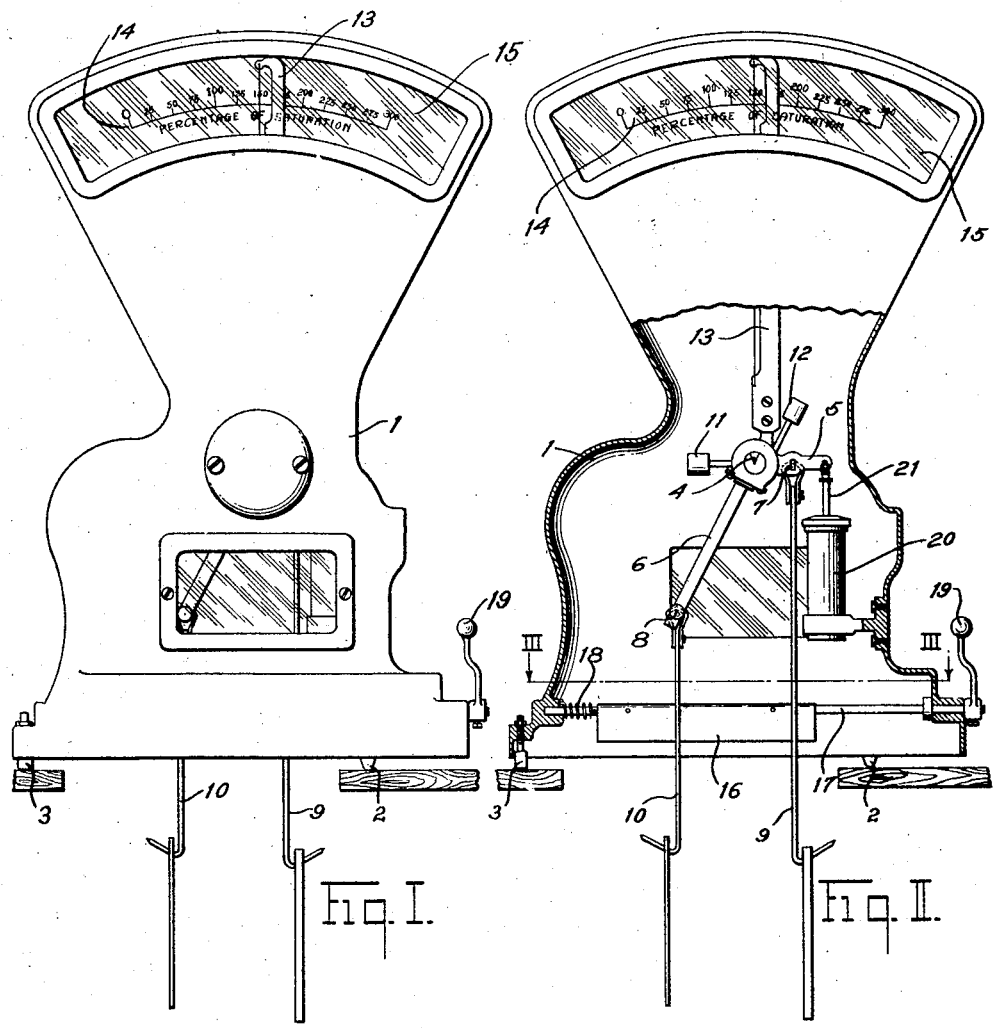
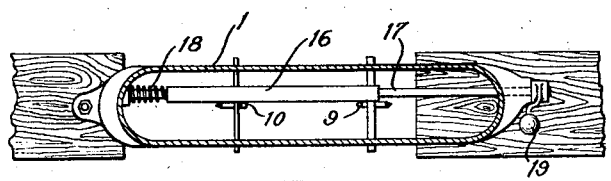
Inventor
EDWARD G. THOMAS.
By
Attorney Patented Mar. 1, 1927.

1,619,164

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

TESTING DEVICE.

Application filed December 17, 1923. Serial No. 681,029.

This invention relates to testing devices, and particularly to means for determining and indicating excess or deficiency of weight of a treated mass of material over an untreated mass of the same bulk.

One of the objects of the invention is the provision of a device of this kind capable of giving a practically instantaneous direct reading of the percentage of gain in weight of a commodity of a given size or the percentage of gain in bulk of a commodity of a given weight.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view showing a scale embodying my invention and adapted to determine and indicate the percentage of saturation of treated felt roofing or similar material;

Figure II is an elevational view of the scale shown in Figure I, part of the housing being broken away to display the mechanism; and Figure III is a sectional plan view taken substantially on the line III—III of Figure II.

The mechanism of the scale is housed and supported by an upright casing 1 which is open at its lower end and which is provided with a pair of non-adjustable feet 2 and an adjustable foot 3 by means of which the scale may be brought to proper level.

Supported by means of a knife edge fulcrum pivot 4 within the casing 1 is a bent lever consisting of a laterally extending arm 5 and a downwardly extending arm 6. The arms 5 and 6 are provided with load pivots 7 and 8 from which are suspended commodity-receiving hooks 9 and 10.

The weight of the arm 5 and the scale parts carried thereby is counterbalanced by means of an adjustably mounted poise 11, while the weight of the arm 6 and its commodity-receiving hook 10 is counterbalanced by a similar poise 12. The bent lever and the parts carried thereby are, therefore, in equilibrium, when the hooks are empty, in any position to which they may be swung. When, however, loads are placed upon the hooks the lever will assume a position in which the horizontal distances from the respective load pivots to the fulcrum pivots are inversely proportional to the loads supported thereby. The pivot 7 on the laterally extending arm 5 is located relatively close to the fulcrum pivot 4, while the pivot 8 on the downwardly extending arm 6 is located at a relatively greater distance from the fulcrum pivot.

Fixed to the bent lever and extending upwardly within the casing 1 is an indicator hand 13 which co-operates with a suitably graduated chart 14 located in the upper end of the casing and visible to the operator through an arcuate window 15. The indicia on the chart are so arranged that when loads of equal weights are supported by the hooks 9 and 10, the indicator hand will register with the zero indicium, and when the weight of the load on the hook 9 is twice the weight of the load on the hook 10, the indicator hand will register with the 100% mark on the chart.

Since the bent lever and the parts carried thereby are supported by a knife edge pivot, the device will operate practically without friction and I have, therefore, provided means to prevent undue swinging of the lever and means to dampen its swinging movement during a weighing operation.

The means for preventing undue swinging of the lever consists of a vane 16 fixed to a rock shaft 17 which is journaled in the casing 1 and so mounted that the vane may swing into engagement with the hooks 9 and 10. A spring 18 normally holds the vane in engagement with the hooks so that when loads are placed on the hooks they must, in swinging the bent lever to a position of approximate balance, rub lightly against the vane. The rock shaft 17 is also provided with a handle 19 by means of which the vane may be swung out of engagement with the hooks 9 and 10 to allow the bent lever to assume a position of absolute balance. The final movement of the parts to exact balancing position is dampened by means of a dash pot 20, the plunger of which is connected through the rod 21 to the laterally extending arm 5 of the lever.

In using the device illustrated and described for testing the percentage of saturation of felt roofing, a piece of the untreated felt cut to a definite size is hung upon the hook 10, which is suspended from the long arm 6 of the bent lever. As the saturated compound is applied to the felt, pieces of the freshly saturated felt are torn out from time to time, cut to the same size as the untreated piece, and hung upon the hook 9. The vane 16 is swung out of engagement with the hooks and the percentage of saturation is immediately indicated on the chart 14 by the indicator hand 13. If the saturated piece weighs twice as much as the unsaturated piece, the indicator hand will indicate a saturation of 100%. If the saturated piece weighs two and a half times as much as the unsaturated piece, the indicator hand will indicate a saturation of 150%, etc. If a saturation of 150% is desired and the test of a sample of the freshly saturated product shows less than 150%, the supply of treating compound may be immediately increased. If the sample shows a percentage of saturation that is too great, the supply of treating compound may be decreased.

In using the device as an ice cream overrun testing scale, a container holding a definite volume of unfrozen cream is hung upon the pivot 7 of the short arm 5 (the weight of the container being, of course, counterbalanced as the weight of the commodity-receiving hook is counterbalanced in the embodiment of the invention illustrated). Samples of aerated cream of the same bulk are then suspended from the pivot 8 on the long arm 6. If, in the case of any given sample, the bulk of the cream has been increased by aeration 100%, a sample of the same volume as that of the unaerated sample will weigh half as much and the indicator will register with a mark on the chart indicating 100% overrun. If the bulk has been increased 150% by aeration, then the original unaerated sample will weigh two and a half times as much as an aerated sample of the same volume and the indicator hand will indicate on the chart an overrun of 150%.

The embodiment of my invention herein shown and described is to be regarded as illustrative only, and it is to be understood that the invention is susceptible to variation, modification, and change within the spirit and scope of the subjoined claims.

Having described my invention, I claim:

1. In a device of the class described, in combination, a bent lever, a commodity-receiver supported by each arm of said bent lever, manually releasable means for normally preventing free swinging of said lever and the parts supported thereby, and an indicator connected to said lever for indicating the relation of the weights of commodities supported by the respective commodity-receivers.

2. In a device of the class described, in combination, differential balancing means, commodity-receivers acting thereupon, manually releasable means for normally preventing free movement of said differential balancing means, and means connected to said differential balancing means for indicating the relative weights of commodities supported by the respective commodity-receivers.

3. In a device of the class described, in combination, a bent lever, a commodity-receiver supported by each arm of said lever, means for counterbalancing said lever and the parts supported thereby irrespective of the position of the lever, manually releasable means for normally preventing free swinging of the lever, and means connected to said lever for indicating relative weights of commodities supported by the respective commodity-receivers.

4. In a device of the class described, in combination, a bent lever having a fulcrum, commodity-receivers supported through said lever by its fulcrum, means adapted to engage one or more of the elements supported by the fulcrum of said lever to prevent free swinging movement of said lever, and means yieldably holding said free movement preventing means in engagement with such element.

5. In a device of the class described, in combination, a bent lever having a fulcrum, commodity-receivers supported through said lever by its fulcrum, means adapted to engage one or more of the elements supported by the fulcrum of said lever to prevent free swinging movement of said lever, means yieldably holding said free movement preventing means in engagement with such element, and a motion dampening device connected to said lever.

6. In a device of the class described, in combination, a bent lever having a laterally and a downwardly extending arm, the downwardly extending arm being of greater length than the laterally extending arm, a commodity-receiver supported by each of said arms, an indicator hand connected to said lever, and a chart co-operating with said indicator hand.

7. In a device of the class described, in combination, a bent lever having a laterally extending arm and a downwardly extending arm, the downwardly extending arm being of greater length than the laterally extending arm, a commodity-receiver supported by each of said arms, an indicator hand connected to said lever, and a chart co-operating with said indicator hand, the laterally extending arm being movable from a position above the horizontal to a position below the horizontal.

EDWARD G. THOMAS.